3,180,906
ACROLEIN COPOLYMERS
Rolf Zimmermann, Wiesbaden-Biebrich, and Hermann Hotze, Mainz-Kostheim, Germany, assignors to Chemische Werke Albert, Wiesbaden-Biebrich, Germany, a corporation of Germany
No Drawing. Filed Mar. 25, 1960, Ser. No. 17,464
Claims priority, application Germany, Mar. 28, 1959, C 18,691
10 Claims. (Cl. 260—860)

This invention relates to new and improved acrolein copolymers and the process by which they are produced.

Homopolymers of acrolein are known. According to Koehler, German Patent 748,690, such homopolymers produced by the catalytic action of thiourea are generally too brittle. Koehler teaches a still hard, but softer, resin could be produced from acrolein by the catalytic action of thiourea provided the polymerization took place in the presence of monohydroxy, or polyhydroxy, compounds including alcohols and phenols. The resins produced by Koehler, however, have been found to have a relatively low molecular weight, have a tendency to yellow and are destroyed even by dilute alkalis and acids and those produced from polyhydroxy compound are strongly interlinked. It was found further that these modified acrolein resins could not be copolymerized with other conventional vinyl monomers, such as styrene, acrylonitriles, or the like either in the initial polymerization phase or by reaction with the vinyl monomers in a second phase reaction.

In accordance with the discoveries of one of the present applicants, acrolein copolymer resins have been produced by exothermically copolymerizing acrolein with an oxirane epoxy compound, including epoxy resins, and/or with polyhydroxy compounds and/or with certain other vinyl compounds in the presence of thiourea, thioamides or semicarbazides. It was found that the polymerizable vinyl monomers, other than acrolein, could be copolymerized with the acrolein and the epoxy compound in an initial copolymerization reaction induced by the catalytic action of the thiourea or related catalysts, or in a subsequent reaction, induced by the catalytic action of known vinyl polymerization catalysts such as organic peroxygen compounds. It would appear highly active ions develop on the epoxy reactants in the presence of the thiourea and the related catalyst which, in turn, initiate the ionization of certain of the other reactants and thereby induce the copolymerization of the acrolein not only with the epoxy compounds but with certain of the other reactants also. In this way, it would appear the epoxy compound not only modifies the acrolein polymers but also orients its reaction with other reactants. In accordance with a preferred practice, a polyadditive copolymer of the acrolein with an oxirane epoxy compound and/or with a polyhydroxy compound and a vinyl monomer was first formed and then dissolved in a vinyl monomer such as styrene, acrylonitrile, vinyl toluene or the like to form a liquid dispersion of a consistency suitable for forming a resin film or cast resin. This liquid dispersion could be caused to react further by the catalytic action of peroxygen compounds, together with accelerators, or other modifiers thereby readily forming hard resins. These hard resins could be formed at room temperature but heat could be applied to hasten the reaction. Although such resins hardened sufficiently rapidly for use in protective and decorative coatings, it was found the copolymerization with the vinyl monomers in which they were dispersed took place too slowly for their practicable use for the formation of cast or molded resin bodies.

Now it has been found that new and improved acrolein copolymer resins, which can be copolymerized readily and rapidly with vinyl monomers in the presence of an organic peroxygen compound and accelerator, can be obtained if acrolein, or a mixture of acrolein and methacrolein, is copolymerized with an epoxy compound, a polyhydric compound, a vinyl compound, or a combination of such compounds of the type set out in the above mentioned discoveries provided the initial polymerization takes place in the presence of catalytic amounts of an alkali metal nitrite, an alkaline earth metal nitrite, an alkali metal aluminum hydride or an alkali metal boron hydride rather than in the presence of catalytic amounts of thiourea or its derivatives. For practical reasons including physical properties, cost factors and availability, sodium and potassium nitrite and sodium or lithium aluminum or boron hydrides are preferred. However, the other alkali metal nitrites namely, lithium, rubidium and caesium nitrite and the other alkali metal boron or aluminum hydrides namely potassium, rubidium or caesium hydride may be used. Among the alkaline earth metal nitrites only calcium, magnesium, barium or strontium nitrites are considered practical as catalysts.

The acrolein copolymers produced in the presence of the alkali metal and alkaline earth metal catalyst mentioned above are capable of being reacted with greater quantities of $\alpha,\beta$-unsaturated vinyl monomers and react with them much more rapidly in the presence of organic peroxides and accelerators than do acrolein copolymers derived from the same reactants in the same proportion by reacting them in the presence of thiourea and the related catalysts mentioned above. It is apparent, therefore, that there are more free, or reactive, double bonds in the initial copolymers of this invention than in the initial copolymers obtained when using thiourea. Thus the catalysts used in this application orient the reaction so that the reactivity of the reactive aldehyde (—CHO) radical of the acrolein is activated to a much greater extent than that of the reactive vinyl ($CH_2$=CH—), or methyl vinyl, radical. In this way, the initial copolymerizations take place preferentially at the CO— radical so that the initial acrolein copolymer still contains a large number of double bonds. Due to the ease and speed of the organic peroxide catalyzed reaction between vinyl monomers and the acrolein copolymers of this invention as initially obtained, the novel acrolein copolymers hereof are especially well adapted for the production of formed resin bodies by molding or casting. On the other hand, the initially produced acrolein copolymers may be dissolved, or otherwise dispersed, in conventional lacquer solvents, and directly used as a protective or decorative coating. The initially produced acrolein copolymer resins hereof may be used also as adhesives or as binding agents for impregnated or coated masses.

Although in most instances, a quite satisfactory product can be obtained by copolymerizing acrolein with the reactants set out above, it will be understood that acrolein may be replaced in desired proportions by methacrolein where one is concerned with improving the brightness or the gloss of the resulting resin copolymer.

The present invention must be visualized as being concerned with a potentially two phase reaction. In the first phase, a copolymer of acrolein is formed with one or more of the types of reactants set out above. This first phase copolymer has a variety of uses per se but it may be used as an intermediate for a second phase polymerization with a polymerizable vinyl monomer.

In the first phase of the reaction, acrolein, or acrolein replaced with the desired amounts of methacrolein, is copolymerized with a quantity of one, or more, of the reactants set out above, e.g. glycidyl ether or an epihalogenhydrin, sufficient to form a copolymer with acrolein and impart desired, or desirable, modified properties to the acrolein resin. Acrolein, or acrolein together with methacrolein, is normally used in a quantity at least equalling, or greater than, the quantity of each of the reactants being copolymerized therewith. However, in the case of reactive vinyl monomers, other than acrolein, the kinship with acrolein is sufficiently close to permit wide variations in the proportions used. Although the reactive vinyl monomre is customarily used in less quantities than acrolein in the production of the initial copolymer, the total amount used in the first phase and the second copolymerization may exceed the quantity of acrolein. It will be understood, however, that the total amount of all the reactants copolymerized with the acrolein often exceeds the total amount of acrolein used. For instance, in the examples given below, disclosing preferred practice of the invention, the amount of acrolein as compared to the amount of other reactants varies from 1:0.5 to 1:2.1.

In determining the quantity of reactants copolymerized with the acrolein, one should bear in mind the attributes each of the reactants is considered to impart to the modified acrolein resins of this invention. The epoxy compounds are considered, among other things, to impart to the copolymer resins increased resistance to alkalis and acids. They are also considered to improve the mechanical qualities of the resins. For instance, acrolein resins copolymerized with epoxy compounds form cast resins having improved bending strength and protective or decorative coatings are considered to have their adhesivity to metals improved. Valuable copolymer resins have been obtained by copolymerizing acrolein, or mixtures of acrolein and methacrolein, and epoxy compounds in weight proportions between 1:0.1 and 1:0.6. Weight ratios as high as 1:1 can be used but weight ratios above 1:1 would convert the copolymer primarily into an epoxy resin rather than preserving the basic attributes of an acrolein resin.

The hydroxy compounds are also considered to impart improved physical characteristics to the resins but, in addition, they facilitate the polymerization as such. For instance, copolymerization of acrolein with p,p'-dihydroxydiphenylmethane and its ethers have been found to improve the thermal stability and bending strength of molded bodies. On the other hand, glycol esters of $\alpha,\beta$-unsaturated dicarboxylic acids facilitate a second phase copolymerization with $\alpha,\beta$-unsaturated vinyl compounds. Therefore, the amount of polyhydric alcohols used is also related to the function they serve. Important improvements in acrolein copolymers have been obtained when the acrolein and the hydroxy compounds are copolymerized in weight ratios between 1:.05 to 1:.5. The alcohols most often are used in weight ratios between about 1:0.1 and 1:0.4.

In determining the quantity of vinyl monomer used, a more complicated problem is involved for the vinyl monomers, other than acrolein, as pointed out above may be used in either or both phases of the copolymerization. However, in the first phase, the amount of vinyl monomer used is normally less by weight than the amount of acrolein or its mixture with methacrolein. Even relatively small amounts of the vinyl monomers have an important impact on the brightness of the copolymer. The total amount of the vinyl compound, other than acrolein, may be up to several times as much as the amount of acrolein. Important improvements in acrolein resins have been obtained by using the polymerizable vinyl monomers in total amounts between 1:.5 and 1:1.5. In the first phase of the reaction, vinyl monomers, other than acrolein, have typically been used in weight ratios of acrolein to vinyl monomers between 1:.2 to 1:.3 in order to improve the compatibility of the initial copolymer with other vinyl compounds in the second phase of the copolymerization. It will be realized, however, that vinyl monomers in weight ratios of acrolein of 1:.1 and lower, will have an important impact on the characteristics of the copolymerization.

In addition to the foregoing, the allyl compounds may be considered in a special category of vinyl compounds for films with improved drying characteristics can be obtained by the use of these compounds. Typically, the allyl compounds have been used quite satisfactorily in acrolein to allyl compound weight ratios between 1:.1 and 1:.5.

The epoxy compounds used to produce the acrolein copolymer resins of this invention all contain an oxirane oxygen atom

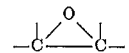

and the term "epoxy compound" is to be so interpreted. For instance, such compounds include epi- and dichlorohydrin, ethylene oxide, propylene oxide, phenyl glycidyl ether, alkylphenyl glycidyl ether, butanediol diglycidyl ether, ethylene glycol diglycidyl ether, lauryl glycidyl ether, dicyclopentadienedioxide, polyglycidyl ether and the like. Among the useful epoxy resins, those obtained through the reaction of bisphenols, in particular p,p'-dihydroxydiphenyldimethylmethane with epichlorohydrin, in alkaline solution and having a high epoxy equivalent are especially advantageously used such as epoxy resins with a molecular weight of 400 and an epoxy equivalent of 175–200. It will be understood, however, that other epoxy resins with relatively high epoxy equivalents may be used as reactants including those in which polyhydric aliphatic alcohols are used in place of the polyhydric phenols. Where the epoxy resins are aliphatic polyglycidyl ethers those used typically have a molecular weight of about 400. Those derived from polyhydric phenols, as stated, preferably have about the same molecular weight but resins with molecular weights between about 300 and 3000 may be used.

Suitable di- or other polyhydric compounds used as reactants are of the type heretofore used in acrolein polymerization and include ethylene glycol, butanediol, hexanediol, hexanetriol, p,p'-dihydroxydiphenyldimethyl-methane and its diglycol ether; or, also, esters of maleic, fumaric, itaconic or citraconic acid which still contain free alcohol hydroxyl groups, preferably their glycol, di- and triethylene glycol esters. Also, one can use the corresponding esters of saturated aliphatic and aromatic di- and higher polybasic polycarboxylic acids.

Suitable vinyl compounds include vinyl acetate, vinyl propionate, vinyl stearate, vinyl pyrrolidone, styrene, acrylonitrile and the like. Various allyl compounds also are suitable, such as ethylene glycol allyl ether, trimethylol propane diallyl ether, pentaerythritol diallyl ether. These, and like, compounds in most cases improve the brightness of the acrolein copolymerizates; and, in addition, they facilitate subsequent copolymerization with styrene, vinyl toluene, diallyl phthalate, methacrylic acid esters or the like. However, it has been found that in the case of the use of lithium-aluminum-hydride and sodium-boronhydride, it is preferable to exclude vinyl compounds which contain carbonyl keto-groups, such as vinyl acetate, or the like for in using such vinyl compounds, copolymers lacking in homogeneity may be produced.

The required amount of catalytic materials used such as the alkali nitrites or lithium aluminum hydride or sodium boron hydride, as is common with catalytic materials, is quite small in comparison to the amount of acrolein used. Generally 0.05 to 0.5% of the catalytic material, based on the weight of the acrolein, is sufficient.

The catalytic effects of the catalysts of this invention are quite surprising. Acrolein alone reacts with alkali nitrites at room temperatures but reacts only very slowly and the so-called disacryl does not separate until several days have passed. On the other hand, the addition of a small quantity of alkali nitrites to a mixture of acrolein and a di- or other polyhydric alcohol triggers an exothermic and rapid polymerization.

The initial polymerization reactions of this invention are exothermic and may be considered polyadditive. For instance, if acrolein is brought into contact with epoxy compounds in the presence of the catalysts of this invention, a splitting of the epoxy group apparently may take place and a polyadditive copolymer is then formed in an exothermic reaction.

In the reactions hereof, once the catalyst is introduced into the reaction mass, an exothermic reaction sets in whereby the temperature may rise as high as 80° C. Cooling with an appropriate coolant, such as the introduction of ice water, is desirable. As the reaction continues, the viscosity of the reaction mixture continuously increases and the smell of free acrolein diminishes more and more.

In a special practice of the invention, a polymerizable vinyl or methyl vinyl monomer suitable for copolymerization with the initial copolymer is then added to the viscous reaction mass. Generally speaking, styrene or vinyl toluene are preferably used but diallyl phthalate and methyl methacrylate have also proven quite satisfactory. The amount of vinyl or methyl vinyl monomer added for the second phase of the polymerization will vary in accordance with the characteristics of the polymerizates contained in the first phase. Usually 30 to 50% of an added vinyl or methyl vinyl monomer, relative to the polymerizates contained in the first phase, is sufficient. Normally, the amount of vinyl monomer added is sufficient to form a free flowing liquid dispersion and, at the same time, to function to rapidly harden the initial copolymerizate upon the addition of organic peroxides and accelerators. In some instances, it is necessary to add an alcohol or the like, to avoid gelling. At times, also, it is advantageous to add small quantities of maleic acid dimethyl ester in order to prevent a too rapid gelling. After the alcohol has served its function, and the copolymerization has reached the stage where gelling is no longer a problem, the alcohol may be driven or drawn off whereby simultaneously traces of unreacted acrolein distill over azeotropically. In this way, a resin solution is obtained, usually with a solids content of 50 to 75%.

Upon the addition of 1 to 4% of an organic peroxide, preferably in the presence of an accelerator, the liquid dispersion of the initial copolymer reaches its final hardness in some instances after only 15 hours. Films coated upon glass or wood in a chosen thickness, and preferably coated with a wax to avoid loss of the vinyl compound, can be ground and polished after only 24 hours. The resulting films excel in surface hardness, have excellent luster, good adhesiveness and chemical resistance. Cast and molded resin bodies formed from these resins have good mechanical and electrical characteristics and can be worked mechanically. Formed bodies can be formed or molded at room temperatures or at elevated temperatures and with, or without, pressure. Conventional fillers such as chalk, lime, silicon carbide, kaolin, quartz powder and similar fillers may be added. Also both inorganic pigment colors or organic dyestuffs may be introduced to impart esthetic properties.

The resins of this invention may also be used to make laminations of glass fibers or of other types of fibers heretofore used for laminating purposes.

The initial copolymerizates of this invention produced in the first phase may be applied directly as coating lacquers if they are thinned with conventional lacquer solvents such as, for instance, a mixture of toluene and ethanol. Also the initial copolymerizates may be used directly as adhesives or as binding agents for various masses.

An understanding of the invention will be facilitated by a consideration of the following illustrative examples in which all parts are expressed as parts by weight.

*Example 1*

Into a three-necked flask, equipped with reflux cooler, stirrer, dropping funnel and thermometer, 100 parts of acrolein, 0.1 part of sodium nitrite, 10 parts of ethylene glycol and 20 parts of an epoxy resin (obtained from p,p'-dihydroxydiphenyldimethylmethane and epichlorohydrin in an alkaline solution, molecular weight 330, melting point 8 to 12° C., epoxy equivalent 175 to 210) were introduced. Within 45 minutes, the temperature rose in an exothermic reaction from 25 to 57° C. The reaction mixture was cooled and 75 parts of styrene were added to about 65° C. and after some time 25 parts of methanol were added. The mass was stirred for about 8 hours until the highly viscous resin cooled off to room temperature. After 24 hours, the added methanol was drawn off in a vacuum whereby, simultaneously, traces of unreacted acrolein distilled over. Fifty (50) parts of this resin solution with a 60% solid content were combined with 4% of a 40% methyl ethyl ketone peroxide paste and with 2% of a cobalt naphthenate solution in styrene (Co-content 4%). After thorough mixing the solution was poured into a mold.

After 24 hours a clear very hard shaped form was obtained having good mechanical characteristics.

*Example 2*

Two hundred (200) parts of acrolein, 0.2 part of sodium nitrite, 20 parts of ethylene glycol and 60 parts butanediol diglycidyl ether were introduced into the above described apparatus. Within 1 hour, a temperature rise from 21° C. to 42° C. was observed due to exothermic heat of reaction. At this temperature, 250 parts of styrene, 50 parts of methanol and 5 parts of maleic acid dimethyl ester were added. The latter prevented gelling of the viscous resin solution. After about 6 hours the reaction was interrupted. Upon combining this resin solution, as in Example 1 with the above described accelerator and peroxide concentration, the casts prepared therefrom will harden within 48 hours at room temperature and show good mechanical and electrical characteristics.

*Example 3*

Two hundred (200) parts of acrolein, 0.2 part of potassium nitrite, 20 parts of ethylene glycol and 60 parts of an epoxy resin having the specifications mentioned in Example 1, were introduced into a reactor. The temperature rose within 1 hour from 20° C. to 35° C. In spite of cooling, the temperature ultimately increased to 50° C. The highly viscous resin mass was mixed with 250 parts of styrene, 100 parts of methanol and 5 parts of maleic acid dimethyl ester and stirred until the resin solution cooled off to 20° C. The cooling took about 4 hours. After letting the solution stand for some time, the added methanol was drawn off in vacuum and the highly viscous solution was again dissolved with 50 additional parts of styrene so that there remained an acrolein copolymerizate in a styrene solution with a solid content of about 62%. Thirty (30) parts of this solution were combined with 1% divinylbenzene, 4% methyl ethyl ketone peroxide (40%) and 2% cobalt naphthenate (Co-content 4%), well mixed and poured into a mold.

After standing for 17 hours at room temperature, a clear, very hard, transparent cast resin was obtained which was slightly yellowish.

When another part of the resin solution with the listed quantities of divinylbenzene, peroxide and accelerator (with added wax) was drawn off on wood as a film having a wet-layer thickness of 400μ, one obtained after 17 hours at room temperature, a film coating which could be very well ground and polished and had a great hardness and a high luster.

*Example 4*

To a solution of 200 parts of acrolein, 30 parts of ethylene glycol and 90 parts of an epoxy resin with the characteristics previously described, 0.2 part sodium nitrite were added. Within 1 hour, the reaction mass exothermically heated up to 40° C. whereupon 300 parts of styrene, 75 parts methanol and 5 parts maleic acid dimethyl ester were added. The resulting solution was stirred for an additional 6 hours. Then, about half of the added methanol was drawn off in vacuum, so that a resin solution with solids content of 57% resulted.

From this resin solution, as described in Example 3, cast resins and film coatings with good characteristics were obtained. The final hardness of the resin was reached at room temperature after only about 20 hours.

*Example 5*

Sixty (60) parts of an epoxy resin (obtained from p,p'-dihydroxydiphenyldimethylmethane and epichlorohydrin in an alkaline solution, molecular weight 470, melting point 20 to 28° C.), epoxy equivalent 225–290, 20 parts p,p'-dihydroxydiphenyldimethylmethane and 2.5 parts ethylene glycol were dissolved in 200 parts acrolein and combined with 0.2 part sodium nitrite. The temperature increased slowly to 35° C. After reaching this temperature the reaction mass stirred for about 6 hours whereupon 300 parts of styrene, 90 parts of methanol and 5 parts maleic acid dimethyl ester were added. After distilling off the added methanol, there remained a highly viscous resin solution with a solids content of 53%.

The solution hardened at room temperature upon the addition of 3% methyl ethyl ketone peroxide, 1.5% of a cobalt accelerator and 1% divinylbenzene. Cast resin bodies showed their final hardness after only 17 hours. The mechanical qualities were good.

*Example 6*

One hundred (100) parts of acrolein, 0.2 part of sodium nitrite, 30 parts of allyl glycidyl ether and 20 parts hexanetriol were introduced into a reactor. Within 2 hours the temperature increased from 19 to 60° C. and the viscosity of the acrolein polymerizate increased. Then 80 parts of styrene and 25 parts of methanol were added and the liquid dispersion was stirred for an additional 4 hours. The added alcohol was distilled off and there remained a 63% resin solution in styrene.

Thirty (30) parts of this resin solution were combined with a mixture of 2% methyl ethyl ketone peroxide, 1% cyclohexanone peroxide as well as with 1% cobalt naphthenate and 1% dodcyl mercaptan. After being well mixed, 0.5% divinylbenzene was added as a cross-linking agent and, after 24 hours, a cast resin of rubber-like consistency was obtained.

*Example 7*

To a suspension of 0.1 part sodium nitrite in 100 parts of acrolein were added 45 parts of epichlorohydrin and 20 parts ethylene glycol. A temperature increase from 20° to 35° C. was observed within 5 minutes. This temperature was maintained for about 1 hour through cooling. Then 100 parts of styrene were added to the highly viscous acrolein copolymer so that there remained a solution with a solids content of 75%.

Fifty (50) parts of this resin solution were combined with 4% methyl ethyl ketone peroxide (40%) and of a cobalt naphthenate solution (4% Co-content), thoroughly mixed and, after addition of 1% divinyl benzene, poured into a form. After standing 24 hours at room temperature, the cast resin was taken out of the form and reached its maximum hardness after an additional 40 hours. Bending strength of the cast resin was about 1600 kg./cm.$^2$.

*Example 8*

To a solution of 100 parts of acrolein, 10 parts of 1,4-butanediol and 30 parts of an epoxy resin (as described in Example 1) was added 0.1 part potassium nitrite. The temperature increased within 10 minutes from 19° to 38° C. The reaction mass was cooled while simultaneously adding 100 parts of styrene, 50 parts of methanol and 5 parts of maleic acid dimethyl ester. Stirring was continued for an additional 2 hours and the added methanol was drawn off under a vacuum. There resulted a solution with a solid content of resin of 60%.

Thirty (30) parts of this solution was combined with 1% divinylbenzene, 4% methyl ethyl ketone peroxide and 1.5% cobalt naphthenate, thoroughly mixed and drawn up on glass plate in a wet-layer of 250$\mu$ thickness. The film coating was almost completely hardened after 24 hours. After additional hardening for 1 hour at 40° C., the film could be effectively ground and polished. The surface was extremely hard, had high luster and good chemical resistance.

*Example 9*

One hundred parts of acrolein, 2 parts of sodium nitrite, 20 parts of vinyl pyrrolidone, 5 parts of ethylene glycol and 20 parts of an epoxy resin (obtained from p,p'-dihydroxy-diphenyldimethyl-methane and epichlorohydrin in an alkaline solution; molecular weight 1400; epoxy equivalent 870–1025; melting point 95–105° C.) were mixed. Within 1 hour one observed a temperature rise from 20 to 52° C.; the viscosity of the copolymerizates continuously increased. The reaction mass was cooled and 150 parts of styrene, 50 parts of methanol and 2 parts maleic acid dimethyl ester were added under stirring. Then stirring was continued until the resin solution cooled off to room temperature which required about 5 hours. Thereafter, the methanol was distilled off and a resin solution having a solid content of 50% was obtained.

From the above resin solution, cast bodies were prepared as in Example 7 and hardened at room temperature in about 20 hours. The cast bodies showed very good mechanical qualities.

*Example 10*

Sixty (60) parts of an epoxy resin (obtained from p,p'-dihydroxydiphenyldimethyl-methane and epichlorohydrin in an alkaline solution, molecular weight 380; epoxy equivalent 173–210), 10 parts of hexanediol were dissolved in 100 parts of acrolein and 0.2 part sodium nitrite was added. The temperature increased from 21 to 50° C. within 45 minutes. The highly viscous solution was cooled and combined with 100 parts of a mixture of vinyl toluene and styrene=1:1 and with 75 parts methanol. Thereafter stirring was continued for an additional 7 hours. Upon distilling off the added methanol, there remained a resin solution with a solids content of 65%. As described in Example 7, a cast body was formed which could be cold hardened. The hardening lasted 5 days but could be speeded up considerably at higher temperature.

*Example 11*

To a solution containing 20 parts of itaconic acid di-tri-ethylene glycol ester, 10 parts of ethylene glycol and 10 parts of an epoxy resin (obtained from 1,4-butanediol and epichlorohydrin; molecular weight 400; epoxy equivalent 210–220) in 100 parts acrolein was added 0.1 part sodium nitrite. The temperature of the reaction mass increased within 1 hour to 50° C. and simultaneously the viscosity increased. The highly viscous resin was combined with 100 parts of styrene and 25 parts of methanol. Thereafter, stirring was continued for an additional 6 hours. After distilling off the methanol, a resin solution with a solid content of 63% was obtained.

Twenty (20) parts of this resin solution were combined with 3% methyl ethyl ketone peroxide (40%), 2% cobalt naphthenate (1% cobalt content) and with 1% divinylbenzene. The well-blended solution was drawn off on wood in a layer of 300$\mu$ thickness. After 24 hours, one obtained, at room temperature, a film which was hard and tough, could be well ground and polished and excelled through especially high luster.

Example 12

One hundred (100) parts of acrolein, 30 parts maleic acid diglycol ester, 10 parts of ethylene glycol, 10 parts of an epoxy resin (as described in Example 11) and 0.2 part of sodium nitrite were introduced into a reactor. Within 3 hours, the temperature increased to 30° C. and 50 parts of styrene were introduced in drops. Then stirring was continued for an additional 6 hours. The resin solution had a solid content of 78%.

Upon drawing off a film on wood, or glass, according to the formula described in Example 11, the film hardened at room temperature after only 15 hours. The surface hardness of the film coating, its grindability and polishability were good.

Example 13

One hundred (100) parts of acrolein, 0.1 part sodium nitrite, 30 parts of lauryl glycidyl ether and 10 parts ethylene of glycol were introduced into a reactor. The temperature increased within 20 minutes to 35° C. Under cooling, 100 parts of styrene and 25 parts methanol were added. Thereafter, stirring was continued for 2 hours. Subsequently, the methanol was distilled off and the remaining resin solution had a solid content of 61%.

Cast resins and shaped forms prepared in accordance with the above described formulation reached their final hardness at room temperature after 30 hours.

Example 14

Fifty (50) parts of acrolein, 0.05 part of sodium nitrite, 15 parts of an epoxy resin (with the characteristics previously described in Example 1) and 5 parts ethylene glycol were introduced into a reactor and polymerized whereby the temperature increased within 25 minutes to 41° C. Upon cooling and adding to the highly viscous resin solution 40 parts methacrylic acid methyl ester and continuing to stir the mass for another 4 hours, a resin solution having a solid content of 65% was obtained.

Fifty (50) parts of the solution were combined with 4% methyl ethyl ketone peroxide, 2% cobalt naphthenate and 0.5% divinylbenzene, thoroughly mixed and poured into a form. After 48 hours a cast resin was obtained with good mechanical qualities.

Example 15

A mixture of 100 parts of acrolein, 40 parts of p,p'-dihydroxydiphenylidmethylmethane, 10 parts of triethylene glycol were combined with 0.1 part sodium nitrite. The temperature increased within 1 hour to 52° C. The reaction mass was cooled and 100 parts of styrene were added and 1 hour later 25 parts of methanol were added. Stirring was continued for 5 hours. After distilling off the methanol, there remained a highly viscous resin solution with a solid content of 60%.

According to the formulation previously described, cold hardening castings were obtained which reach their final hardness at room temperature after 72 hours. Bending strength: 1300 kg./cm.$^2$.

Example 16

One hundred parts of acrolein, 20 parts hexanediol and 0.1 part sodium nitrite were introduced into a reactor. The temperature increased within 1 hour to 50° C. The reaction mass was cooled and 100 parts of styrene were stirred in and, a little later, 35 parts of methanol. Stirring was continued for 3 more hours. After an additional 24 hours, the added methanol with traces of unreacted acrolein were distilled off leaving a resin solution (solids content of 54%).

Upon the addition of a peroxide and an accelerator in the aforementioned manner a cold hardening resin was obtained suitable for spreading and casting.

Example 17

To a solution of 100 parts of acrolein, 30 parts of methacrolein and 10 parts ethylene glycol was added 0.1 part sodium nitrite. The temperature increased within 15 minutes to 50° C. Upon cooling, after a further 20 minutes, 75 parts styrene were added. The highly viscous resin solution became cloudy. After the addition of 25 parts of methanol the resin solution became clear again. Stirring was continued for another 2½ hours and, towards the end of the reaction, 3 parts of maleic acid dimethyl ester were added. After distilling off the added methanol, there remained a highly viscous resin solution with a solids content 73%.

(a) 10 parts of this resin solution were combined with 4% methyl ethyl ketone peroxide, 2% cobalt accelerator and with 0.5% divinyl benzene. The solution was then poured into a mold and one obtained after 40 hours at room temperature a very hard, clear, colorless cast resin with good mechanical and electrical properties.

(b) 10 parts of this resin solution were combined, as above, with a peroxide and an accelerator and then mixed with chalk in the ratio 1:1. Upon pouring this mixture into a mold, one obtained, again at room temperature, after 40 hours a very hard cast body. Silicon carbide, kaolin, asbestos or quartz powder or other fillers can be substituted for the chalk. Hardening of the cast bodies and their mechanical properties were in all cases very good.

(c) 30 parts of the above resin solution were used, after addition of a peroxide and an accelerator in the previously listed concentration, for the lamination of glass fibers. This was done by placing three layers of glass fibers one on the other, saturated with resin and placed into a form and hardened cold under light pressure. Bending strength of the laminated resin was 1800 kg./cm.$^2$.

Example 18

Thirty (30) parts of acrylonitrile and 10 parts ethylene glycol were dissolved in 100 parts acrolein and combined with 0.1 part sodium nitrite. The temperature increased within 20 minutes to 50° C. After cooling, 100 parts of styrene and 25 parts methanol were added. Then 3 parts maleic acid dimethyl ester were added. Thereafter stirring was continued for several hours. After distilling off the methanol, a 70% resin solution was obtained.

Upon formulating the resin solution as described above, cast bodies and films were formed. The hardening period was about 3 days but could be shortened to about 36 hours at 40° C.

Example 19

A mixture of 200 parts of acrolein, 20 parts of allyl ether of ethylene glycol and 40 parts of p,p'-dihydroxydiphenyldimethylmethane was combined with 0.2 part sodium nitrite. The temperature increased within one half hour to 35° C. and the viscosity of the polymerizate continuously increased. The reaction mass was cooled and combined with 250 parts of styrene and 25 parts of methanol. After stirring for 6 hours, an additional 25 parts of methanol and 5 parts maleic acid dimethyl ester were added. The next day the methanol was distilled off and a resin solution with a solid content of 55% was obtained.

Fifty (50) parts of the resin solution were combined with 1% divinylbenzene, 3% methyl ethyl ketone peroxide (40%) and with 1.5% cobalt naphthenate solution (4% cobalt content), well mixed and poured into a mold. After 24 hours a slightly yellowish cast resin was obtained which could be easily removed from the form and which reached its final hardness after 3 days. The mechanical properties of the cast resin body were very good.

Example 20

A solution of 100 parts of acrolein, 30 parts of methacrolein and 10 parts ethylene glycol were combined with 0.05 part potassium nitrite. The temperature increased within 30 minutes to 36° C. The highly viscous resin solution was held at temperatures of 35 to 36° C. and combined with 100 parts of styrene, 35 parts of methanol and 2 parts maleic acid dimethyl ester. Subsequently stirring was continued for an additional 2 hours. Next day, the added methanol and the traces of unreacted acrolein were distilled off. The resulting resin solution showed a solids content of 60%.

Resin bodies were cast according to the formula given in Example 19. They hardened completely at room temperature within 48 hours. The cast resin bodies were water-clear, colorless and very hard.

*Example 21*

One hundred (100) parts of acrolein, 0.2 part of sodium nitrite, 0.05 part of potassium nitrite, 30 parts of vinyl propionate and 20 parts of ethylene glycol were introduced into a reactor. After 4 hours, the reaction temperature was 40° C. Then the highly viscous resin solution was combined with 50 parts of styrene and stirred for a few additional hours.

Twenty (20) parts of this batch were spread, after addition of 4% methyl ethyl ketone peroxide and 2% cobalt naphthenate, on wood in a layer of 300μ thickness. Within 24 hours, a clear, completely colorless film was obtained which could be well ground and polished. The film surface was scratch resistant.

*Example 22*

A mixture of 100 parts of acrolein, 0.2 part sodium nitrite, 30 parts of vinyl butyrate and 20 parts of ethylene glycol were introduced into a reactor. A temperature increase to 35° C. was observed within one hour. Subsequently, upon cooling, the highly viscous reaction product was combined with 100 parts of styrene, 25 parts of methanol and 2 parts maleic acid dimethyl ester and stirred for 3 more hours. The resin solution, thus obtained, had a solids content of 65%.

This resin solution was formulated as described in Example 21. Cold hardening film coatings with good mechanical properties were obtained therefrom. The stability towards chemicals was good.

*Example 23*

Upon mixing 100 parts of acrolein, 0.1 part of sodium nitrite, 30 parts of vinyl pyrrolidone and 10 parts of 1,4-butanediol, a temperature rise to 50° C. took place within 15 minutes and a highly viscous solution was obtained. Under cooling, the viscous solution was mixed with 100 parts of styrene, 25 parts of methanol and 2 parts of maleic acid dimethyl ester and then stirred for 2 more hours. Next day, the methanol was drawn off under a vacuum, so that there remained a resin solution having a solids content of 63%.

Upon adding catalysts as described above, cast resins of great firmness were obtained. Hardening lasted 70 hours at room temperature but could be considerably speeded up through some heating.

*Example 24*

A solution of 50 parts acrolein, 15 parts vinyl propionate and 10 parts ethylene glycol was combined with 0.1 part sodium nitrite. The temperature increased within 20 minutes to 35° C. The reaction mass was cooled and after about one hour was combined with 25 parts of methacrylic acid methyl ester and stirred for an additional 6 hours.

Twenty (20) parts of this 75% resin solution were combined with 4% methyl isobutyl ketone peroxide, 2% cobalt naphthenate (Co-content 1%) and with 0.5 % divinylbenzene. Upon pouring the well mixed solution into a mold, a cast body was obtained which hardened in 24 hours well enough to be taken out of the mold. After 3 hours heating to 40° C., the cast body hardened tension-free.

The resin batch described in Example 24 was reconstituted but the acrolein copolymerizate thus formed was

*Example 25* diluted with an equal quantity of diallylphthalate instead of methacrylic methyl ester. The course of the reaction was analogous.

Cast resins made from this 75% resin solution will harden in the cold to a rubber-like consistency and can subsequently be hardened at increased temperature.

*Example 26*

One hundred (100) parts of acrolein, 30 parts of trimethylolpropane diallyl ether, 10 parts of ethylene glycol and 0.1 part sodium nitrite were introduced into a reactor. The temperature of the reaction mixture increased in 15 minutes to 37° C. The highly viscous resin mass was cooled and combined with 100 parts of styrene and 25 parts of methanol and stirring was continued for some hours more. After distilling off the methanol, there remained a resin solution of 61% solids.

Thirty (30) parts of this solution was combined with 4% methyl ethyl ketone peroxide (40%), 2% cobalt naphthenate solution (4% solution in styrene) and 1% divinylbenzene and the well-mixed solution was introduced into a mold. After 30 hours, the rubber-like formed body was removable, and could be re-hardened at 50° C.

*Example 27*

A mixture of 100 parts of acrolein, 30 parts of pentaerythritol diallyl ether and 10 parts ethylene glycol were combined with 0.1 part sodium nitrite. The course of the reaction is analogous to that of Example 26.

A 61% solution of the acrolein copolymerizate in styrene acts, after addition of a peroxide and an accelerator, as described in the preceding example.

*Example 28*

One hundred (100) parts of acrolein, 30 parts of ethylene glycol monoallyl ether and 10 parts of ethylene glycol were mixed with 0.1 part sodium nitrite. The temperature of the reaction mixture increased within 10 minutes to 39° C. While cooling, 100 parts of styrene and 10 parts of methanol were added and the mixture was stirred for an additional 3 hours. Next day the methanol was drawn off so that there remained a resin solution of 61% solids.

Cast resin bodies prepared according to the already known formulas became hard at room temperature after 48 hours but still remained elastic.

*Example 29*

A solution of 25 parts of p,p'-dihydroxydiphenyldimethylmethane diglycol ether, 5 parts of ethylene glycol and 100 parts acrolein were mixed with 0.1 part of potassium nitrite. Temperatures increased within 10 minutes to 50° C. The highly viscous resin solution was combined, under cooling, with 125 parts of styrene, 25 parts of methanol and 2 parts of maleic acid dimethyl ester and subsequently stirred for an additional 5 hours. Next day the methanol was distilled off so that the resin solution had a solids content of 59%.

(a) After addition of 3% methyl ethyl ketone peroxide, 1.5% cobalt accelerator and 1% divinylbenzene, 20 parts of this resin solution were poured into a form or mold. After letting it stand at room temperature for 15 hours, the cast was rubber-like but elastic and after 40 hours it showed its final hardness. Its mechanical properties were good.

(b) 10 parts of each of the resins were mixed, after addition of a peroxide and an accelerator, with various pigment substances, such as heliogen blue B, helio-true orange RL or cadmium yellow. The compatibility with the resin was very good. The hardening process was not affected by the addition of the colorants.

*Example 30*

Upon mixing 100 parts of acrolein, 0.1 part of sodium nitrite and 20 parts of triethylene glycol there ensued within 20 minutes a temperature rise to 40° C. The viscous acrolein copolymerized was cooled and combined with 100 parts of styrene, 25 parts of methanol and 2 parts maleic acid dimethyl ester and then stirred for 6 hours more. After distilling off the methanol, there remained a solution with 53% solids.

According to the already stated formula, cold hardening film coatings and cast bodies of great clarity and good mechanical properties were obtained from the resin solution.

*Example 31*

One hundred (100) parts of acrolein, 30 parts of an epoxy resin (prepared from p,p'-dihydroxydiphenyldimethylmethane and epichlorhydrin as previously described), 5 parts of ethylene glycol and 0.08 part of lithium aluminum hydride were introduced into a reactor. The temperature increased within a few minutes to 45° C. Under cooling, 100 parts of styrene 25 parts of methanol and 4 parts of maleic acid dimethyl ester were introduced. The resulting mass was stirred 5 hours more. After distilling off the added methanol, a 65% resin solution was obtained.

Fifty (50) parts of this resin were combined with 2.5% methyl ethyl ketone peroxide and 1.3% cobalt naphthenate solution. Then 1% divinylbenzene was thoroughly mixed in and the mixture was poured into a form. After standing for 10 hours at room temperature, a colorless, very hard cast resin body was obtained.

*Example 32*

The batch used in Example 31 was also catalyzed with sodium boron hydride. The course of the reaction was analogous to that using lithium aluminum hydride.

Here too one obtained with styrene or other polymerizable vinyl compounds, after addition of a peroxide and an accelerator, film coatings and molded resin bodies, rapidly hardening in the cold, and having good mechanical and electrical properties.

*Example 33*

Twenty (20) parts of epichlorhydrin, 10 parts of p,p'-dihydroxydiphenyldimethylmethane and 5 parts of ethylene glycol with 0.1 part lithium aluminum hydride were dissolved in 100 parts of acrolein. The temperature of this mixture increased within 25 minutes to 50° C. In spite of cooling, the temperature continued to rise to 60° C. After 100 parts of styrene, 25 parts of methanol, 2 parts of maleic acid dimethyl ester were added; the mass was stirred for 3 hours more. The next day, the methanol was distilled off under a vacuum and one obtained a resin solution with a solids content of 58%.

Thirty (30) parts of this resin solution were poured into a form, after 4% methyl ethyl ketone peroxide, 2% cobalt naphthenate and 0.5% divinylbenzene had been introduced. At room temperature, the cast body could be removed from the form after 15 hours and it reached its maximum hardness after 40 hours all told.

*Example 34*

One hundred (100) parts of acrolein, 0.1 part lithium aluminum hydride, 30 parts of methacrolein, 25 parts of butanediol diglycidyl ether and 5 parts of ethylene glycol are brought to reaction. After 20 minutes one observes a temperature increase to 50° C. The addition of 50 parts of styrene followed under cooling.

From this resin solution one can prepare, according to the formulation stated in Example 33, cast resin bodies which will harden at room temperature within 30 hours.

The various examples are included solely as illustrative embodiments of the invention. For instance, the polyhydric compounds may be used in sufficiently large quantities so that they function to facilitate the polymerization and function also to importantly modify the acrolein compound or the polyhydric compounds may be used in such small quantities that they function primarily to facilitate the copolymerization with the other reactants set out above. Thus it will be apparent to those skilled in the art that the reactants disclosed in the examples, the proportions of reactants, the reaction media used, the conditions under which the reactants react and the resultant reaction products may be widely varied and still fall within the scope of the invention as taught herein and as defined in the appended claims.

We claim:
1. A resin comprising the polycondensation product of (1) an aldehyde selected from the group consisting of acrolein and mixtures of acrolein and methacrolein with (2) an epoxy resin derived from a bisphenol and a chlorohydrin and containing at least two

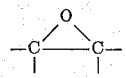

groups, said polycondensation having been carried out in the presence of a catalytic amount of a catalyst selected from the group consisting of an alkali metal nitrite, alkaline earth metal nitrite, alkali metal aluminum hydride and an alkali metal boron hydride.

2. A resin comprising the polycondensation product of (1) an aledhyde selected from the group consisting of acrolein and mixtures of acrolein and methacrolein with (2) an epoxy resin derived from a polyhydric aliphatic alcohol and a chlorohydrin and containing at least two

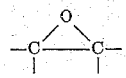

groups, said polycondensation having been carried out in the presence of a catalytic amount of a catalyst selected from the group consisting of an alkali metal nitrite, alkaline earth metal nitrite, alkali metal aluminum hydride and an alkali metal boron hydride.

3. A resin comprising the polycondensation product of (1) an aledhyde selected from the group consisting of acrolein and mixtures of acrolein and methacrolein with (2) at least one epoxy compound which is free from aliphatic carbon to carbon unsaturation and contains at least one

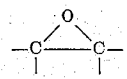

group and (3) at least one ester of an α,β-olefinically unsaturated dicarboxylic acid and a polyhydric aliphatic alcohol, said ester containing two alcoholic hydroxy groups, said polycondensation having been carried out in the presence of a catalytic amount of a catalyst selected from the group consisting of an alkali metal nitrite, alkaline earth metal nitrite, alkali metal aluminum hydride and an alkali metal boron hydride.

4. A resin comprising the polycondensation product of (1) an aldehyde selected from the group consisting of acrolein and mixtures of acrolein and methacrolein with (2) an epoxy compound which is free from aliphatic carbon to carbon unsaturation and contains at least one

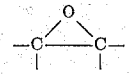

group and (3) a dihydric alcohol consisting of the bis-ethylene glycol ether of p,p'-dihydroxydiphenyldimethylmethane, said polycondensation having been carried out in the presence of a catalytic amount of a catalyst selected from the group consisting of an alkali metal nitrite, alkaline earth metal nitrite, alkali metal aluminum hydride and an alkali metal boron hydride.

5. A hardened resin comprising the copolymerization product of (A) the polycondensation product of (1) an aldehyde selected from the group consisting of acrolein and mixtures of acrolein and methacrolein with (2) at least one at least bivalent compound selected from the group consisting of monomeric saturated aliphatic epoxy compounds having from 2 to 15 carbon atoms, phenyl glycidyl ether, alkyl phenyl glycidyl ether, dicyclopentadiene dioxide, epoxy resins derived from bisphenols and epichlorohydrin, epoxy resins derived from polyhydric aliphatic alcohols and epichlorohydrin, polyhydric alcohols containing from 2 to 19 carbon atoms and esters of dicarboxylic acids and polyhydric aliphatic alcohols, said esters containing at least two alcoholic hydroxy groups, said polycondensation having been carried out in the presence of a catalytic amount of a catalyst selected from the group consisting of an alkali metal nitrite, alkaline earth metal nitrite, alkali metal aluminum hydride and an alkali metal boron hydride with (B) a polymerizable compound having the grouping $H_2C{=}C<$ and being liquid under ordinary conditions, said copolymerization product having been obtained under the catalytic action of an organic peroxide.

6. A hardened resin comprising the copolymerization product of (A) the polycondensation product of (1) an aldehyde selected from the group consisting of acrolein and mixtures of acrolein and methacrolein with (2) an epoxy resin which contains at least one

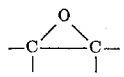

group and is derived from epichlorohydrin and a bisphenol, said polycondensation having been carried out in the presence of a catalytic amount of a catalyst selected from the group consisting of an alkali metal nitrite, alkaline earth metal nitrite, alkali metal aluminum hydride and an alkali metal boron hydride with (B) a liquid polymerizable compound having the grouping $H_2C{=}C<$, said copolymerization product having been obtained under the catalytic action of an organic peroxide.

7. A hardened resin comprising the copolymerization product of (A) the polycondensation product of (1) an aldehyde selected from the group consisting of acrolein and mixtures of acrolein and methacrolein with (2) an epoxy compound which is free from aliphatic carbon to carbon unsaturation and contains at least one

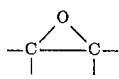

group and (3) at least one ester of an $\alpha,\beta$-olefinically unsaturated dicarboxylic acid and a polyhydric aliphatic alcohol, said ester containing two alcoholic hydroxy groups, said polycondensation having been carried out in the presence of a catalytic amount of a catalyst selected from the group consisting of an alkali metal nitrite, alkaline earth metal nitrite, alkali metal aluminum hydride and an alkali metal boron hydride with (B) a liquid polymerizable compound having the grouping $CH_2{=}C<$, said copolymerization product having been obtained under the catalytic action of an organic peroxide.

8. In a process for producing hardened formed bodies and coatings from a liquid polymerizable compound having the grouping $H_2C{=}C<$ the improvement which comprises forming in a first stage a polycondensation product soluble in said polymerizable compound by reacting (1) an aldehyde selected from the group consisting of acrolein and mixtures of acrolein and methacrolein with (2) at least one at least bivalent compound selected from the group consisting of monomeric saturated aliphatic epoxy compounds having from 2 to 15 carbon atoms, phenyl glycidyl ether, alkyl phenyl glycidyl ether, dicyclopentadiene dioxide, epoxy resins derived from bisphenols and epichlorohydrin, epoxy resins derived from polyhydric aliphatic alcohols and epichlorohydrin, polyhydric alcohols containing from 2 to 19 carbon atoms and esters of dicarboxylic acids and polyhydric aliphatic alcohols, said esters containing at least two alcoholic hydroxy groups, in intimate admixture with (3) a catalytic amount of a catalyst selected from the group consisting of an alkali metal nitrite, alkaline earth metal nitrite, alkali metal aluminum hydride, and an alkali metal boron hydride, and converting in a second stage a solution of said polycondensation product in said liquid polymerizable compound into a hardened copolymer by the catlytic action of an organic peroxide.

9. In a process for producing hardened formed bodies and coatings from a liquid polymerizable compound having the grouping $H_2C{=}C<$ the improvement which comprises forming in a first stage a polycondensation product soluble in said polymerizable compound by reacting (1) an aldehyde selected from the group consisting of acrolein and mixtures of acrolein and methacrolein with (2) at least one epoxy compound which is free from aliphatic carbon to carbon unsaturation and contains at least one

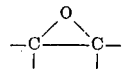

group in intimate admixture with (3) at least one ester of an $\alpha,\beta$-olefinically unsaturated dicarboxylic acid and a polyhydric aliphatic alcohol, said ester containing two alcoholic hydroxy groups, and (4) a catalytic amount of a catalyst selected from the group consisting of an alkali metal nitrite, alkaline earth metal nitrite, alkali metal aluminum hydride and an alkali metal boron hydride and converting in a second stage a solution of said polycondensation product in said liquid polymerizable compound into a hardened copolymer by the catalytic action of an organic peroxide.

10. A hardened resin comprising the copolymerization product of (A) the polycondensation product of (1) an aldehyde selected from the group consisting of acrolein and mixtures of acrolein and methacrolein with (2) at least one at least bivalent compound selected from the group consisting of monomeric saturated aliphatic epoxy compounds having from 2 to 15 carbon atoms, phenyl glycidyl ether, alkyl phenyl glycidyl ether, dicyclopentadiene dioxide, epoxy resins derived from bisphenols and epichlorohydrin, epoxy resins derived from polyhydric aliphatic alcohols and epichlorohydrin, polyhydric alcohols containing from 2 to 19 carbon atoms and esters of dicarboxylic acids and polyhydric aliphatic alcohols, said esters containing at least two alcoholic hydroxy groups, said polycondensation having been carried out in the presence of a catalytic amount of an alkali metal boron hydride with (B) a polymerizable compound having the grouping $H_2C{=}C<$ and being liquid under ordinary conditions, said copolymerization product having been obtained under the catalytic action of an organic peroxide.

References Cited by the Examiner

UNITED STATES PATENTS 2,809,185 10/57 Hearne et al. _____ 260—67
2,839,514 6/58 Shokal et al. _____ 260—73
3,028,362 4/62 Zimmermann _____ 260—835

LEON J. BERCOVITZ, *Primary Examiner.*

D. ARNOLD, WILLIAM H. SHORT, *Examiners.*